United States Patent
Hu

(10) Patent No.: US 9,760,980 B1
(45) Date of Patent: Sep. 12, 2017

(54) CORRECTING MOIRÉ PATTERN EFFECTS

(71) Applicant: Amazon Technologies, Inc., Seattle, WA (US)

(72) Inventor: Hao Hu, Belmont, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 85 days.

(21) Appl. No.: 14/668,250

(22) Filed: Mar. 25, 2015

(51) Int. Cl.
| G06K 9/00 | (2006.01) |
| G06T 5/00 | (2006.01) |
| H04N 5/21 | (2006.01) |
| G06T 5/40 | (2006.01) |

(52) U.S. Cl.
CPC ............... *G06T 5/002* (2013.01); *G06T 5/40* (2013.01); *H04N 5/21* (2013.01); *G06T 2207/10024* (2013.01); *G06T 2207/20021* (2013.01); *G06T 2207/20182* (2013.01)

(58) Field of Classification Search
CPC . G06T 5/002; G06T 5/40; G06T 2207/10024; G06T 2207/20182; G06T 2207/20021; H04N 5/21
USPC .................................................. 382/167, 264
See application file for complete search history.

(56) References Cited

U.S. PATENT DOCUMENTS

| 4,288,821 | A * | 9/1981 | Lavallee | G06T 3/4007 358/3.07 |
| 2001/0028347 | A1 * | 10/2001 | Kawahara | G09G 3/2022 345/204 |
| 2002/0106125 | A1 * | 8/2002 | Queiroz | H04N 1/40062 382/191 |
| 2002/0161835 | A1 * | 10/2002 | Ball | G06F 3/14 709/203 |

FOREIGN PATENT DOCUMENTS

EP  2600604 A1  6/2013

* cited by examiner

*Primary Examiner* — Andrew Moyer
(74) *Attorney, Agent, or Firm* — Pierce Atwood LLP

(57) ABSTRACT

Devices, systems and methods are disclosed for reducing an amount of moiré pattern exhibited by an image having a halftone pattern. Regions of the image including the halftone pattern may be identified and selectively blurred to reduce the amount of moiré pattern visible to a user. The halftone pattern may be detected using digital wavelets to identify high frequency patterns in the image. The halftone pattern may be blurred using a convolution matrix having a weighted average, and a transition band may be used to reduce an intensity of the blur near the edges of the halftone pattern.

18 Claims, 12 Drawing Sheets

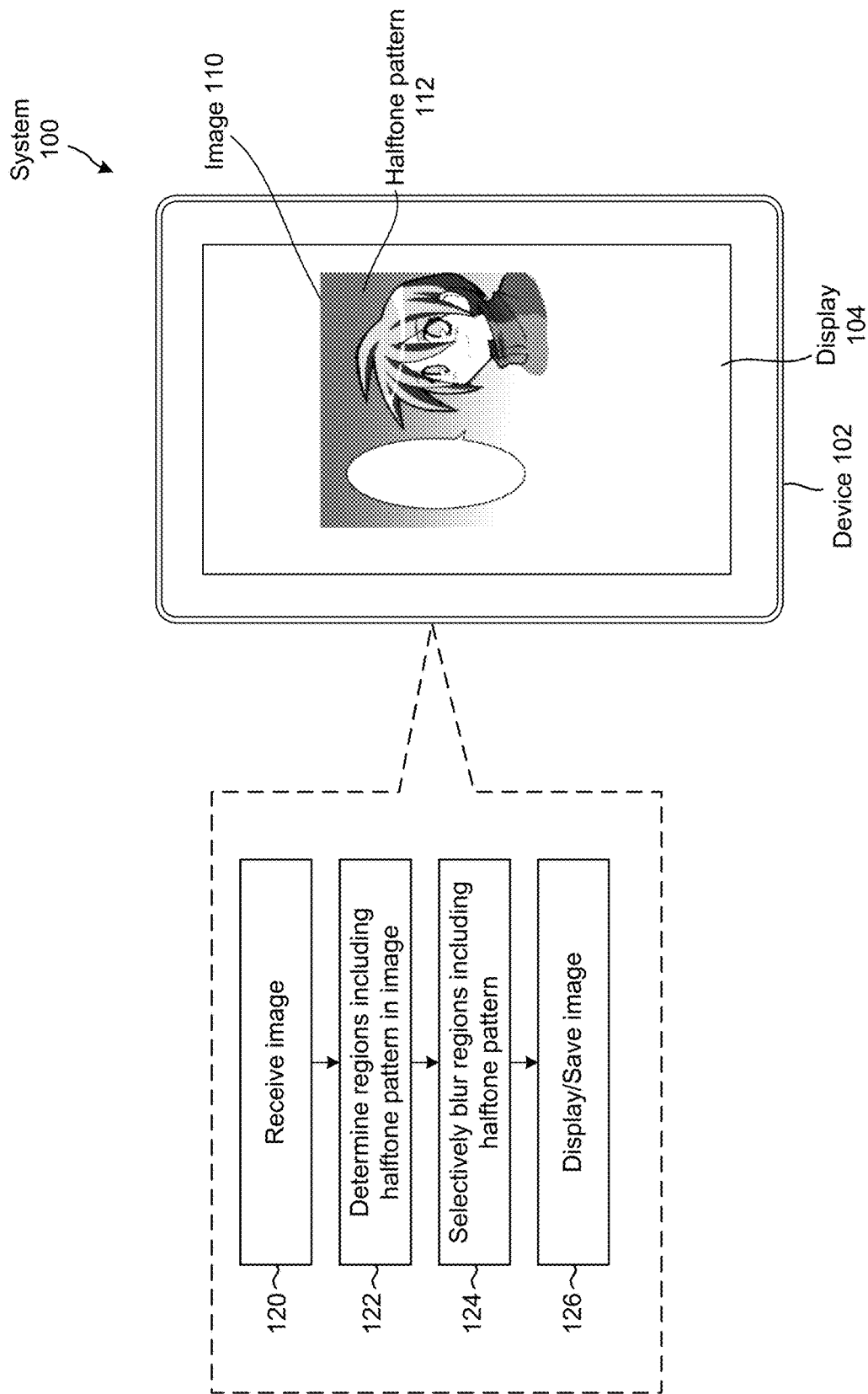

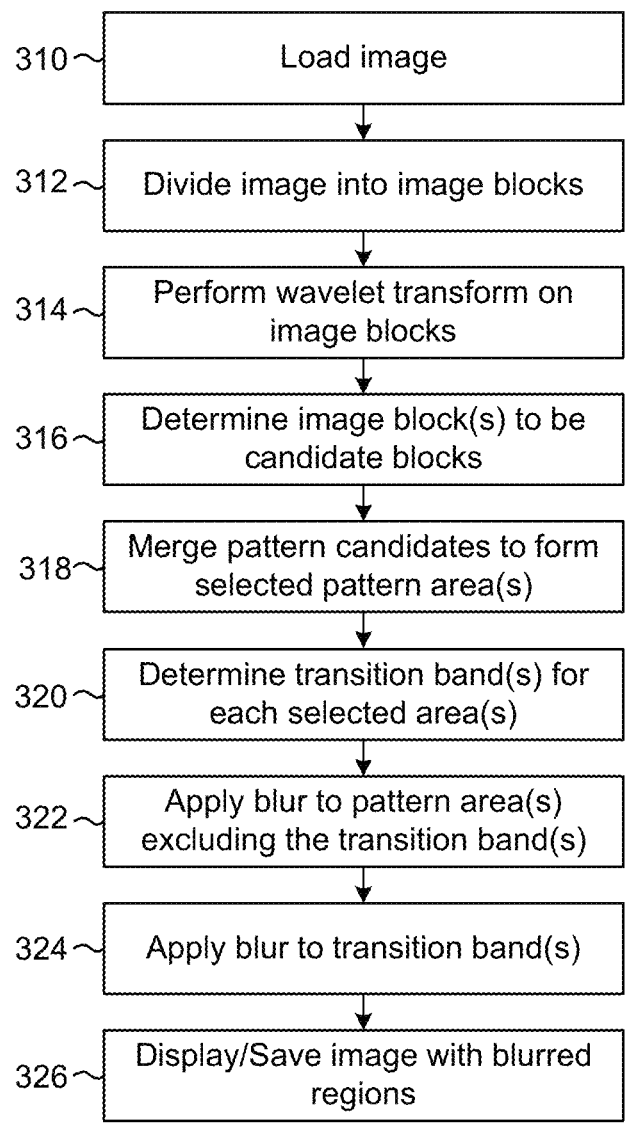

Selected Pattern Area 430-1
Blur Center 432-1
Transition Band 434-1
Unblurred Region 436-1

Selected Pattern Area 430-2
Blur Center 432-2
Transition Band 434-2
Unblurred Region 436-2

FIG. 5A

| | | |
|---|---|---|
| 1 | 1 | 1 |
| 1 | 1 | 1 |
| 1 | 1 | 1 |

— Averaging kernel 520-1

FIG. 5B

| | | |
|---|---|---|
| 1 | 1 | 1 |
| 1 | 8 | 1 |
| 1 | 1 | 1 |

— Averaging kernel 520-2

FIG. 5C

| | | | | |
|---|---|---|---|---|
| 1 | 1 | 1 | 1 | 1 |
| 1 | 1 | 1 | 1 | 1 |
| 1 | 1 | N | 1 | 1 |
| 1 | 1 | 1 | 1 | 1 |
| 1 | 1 | 1 | 1 | 1 |

— Averaging kernel 520-3

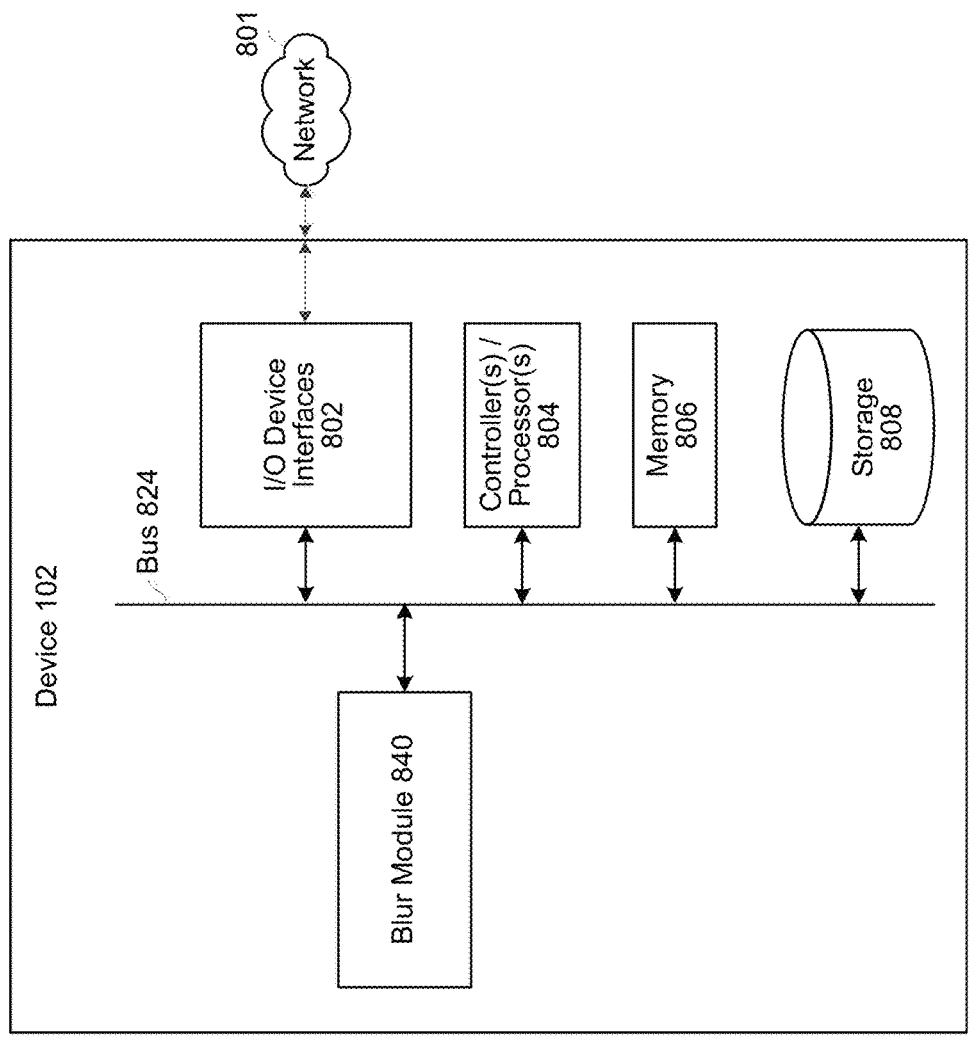

CORRECTING MOIRÉ PATTERN EFFECTS

BACKGROUND

With the advancement of technology, the use and popularity of electronic devices has increased considerably. Electronic devices are commonly used to display content that previously was displayed in print.

BRIEF DESCRIPTION OF DRAWINGS

For a more complete understanding of the present disclosure, reference is now made to the following description taken in conjunction with the accompanying drawings.

FIG. 1 illustrates an overview of a system for implementing embodiments of the present disclosure.

FIG. 3 illustrates a flowchart illustrating an example method for conditionally blurring an image according to embodiments of the present disclosure.

FIGS. 5A-5C illustrate examples of blurring techniques to reduce a moiré pattern according to embodiments of the present disclosure.

FIGS. 7A-7C illustrate an image being conditionally blurred according to embodiments of the present disclosure.

FIG. 8 illustrates a block diagram conceptually illustrating example components of a device according to embodiments of the present disclosure.

DETAILED DESCRIPTION

Figure 2A:
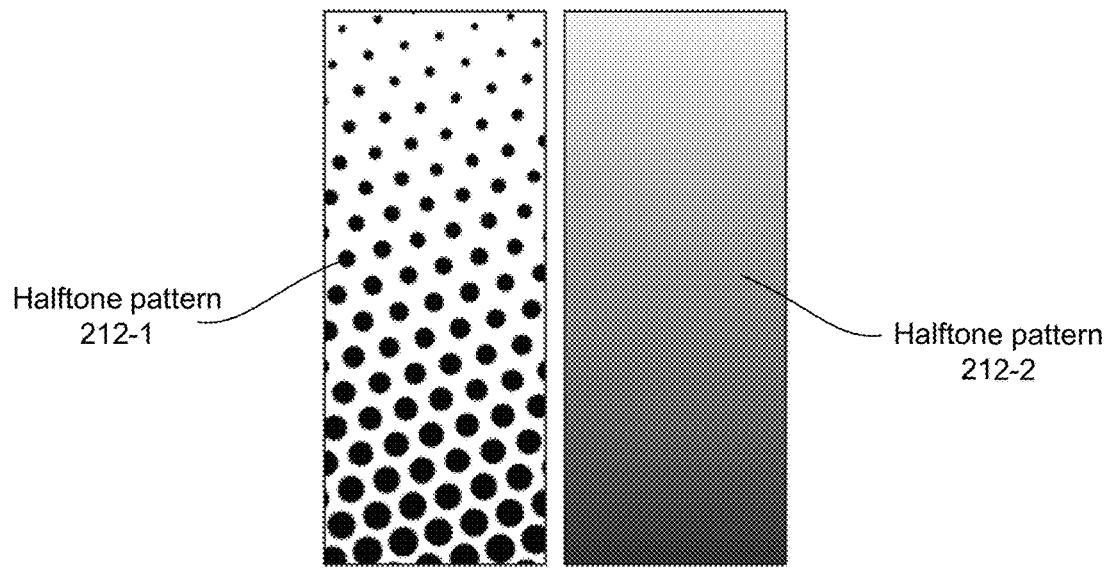
FIGS. 2A-2E illustrate examples of halftone patterns and an image with and without a moiré pattern.

Electronic devices are increasingly used to display content, such as images, at various resolutions (e.g., number of pixels included in an image) and/or magnifications (e.g., number of pixels used by a display to display the image). In some cases, optical illusions or aberrations may be caused by certain combinations of resolution and magnification. For example, a moiré pattern is a secondary and visually evident superimposed pattern that may appear in various images and/or video. The moiré pattern may be an undesirable effect that degrades the quality of the images and/or video and/or distracts a user. Typically, a moiré pattern is created by overlaying a first pattern on a second pattern in an image or video, such as two sets of parallel lines offset from each other. Some moiré patterns are created by a first pattern included in an image or video interacting with a second pattern created by displaying the image or video, such as by scanning techniques used to produce, capture or display pictures or videos. Thus, moiré patterns can appear in print images (e.g., newspaper print, comic books, manga or the like), electronic images (e.g., digital images, digital copies of print images, or the like) and/or video content (e.g., television broadcasts, cable broadcasts, streaming video, movies or the like).

While the patterns that create a moiré pattern may vary, a common cause of moiré is halftone or screentone patterns (hereinafter, "halftone patterns" will refer to both halftone and screentone patterns). Halftone patterns use dots varying in shape, size, spacing and/or color to simulate a wide range of colors and grays using a limited number of colors. For example, a newspaper may print a black and white image with only black ink, using halftone patterns to simulate a continuous tone or multiple shades of grey. Similarly, a newspaper may print a color image with a limited number of color inks (e.g., black, cyan, magenta and yellow), using halftone patterns to simulate a continuous tone or multiple colors and/or shades of colors. At certain distances/zooms, a halftone pattern may appear to be a series of parallel lines, whereas at other distances/zooms a halftone pattern may appear to be a dot pattern, or even a different series of lines. Thus, overlaying a first halftone pattern and a second halftone pattern may result in a visible moiré pattern, as may displaying a first halftone pattern using an electronic display having a second pattern (e.g., a scanning technique using horizontal scan lines) at certain magnifications.

To eliminate or reduce a likelihood of a moiré pattern being visible, devices, systems and methods are disclosed for selecting regions of halftone pattern and blurring the halftone pattern. For example, regions of an image including a halftone pattern may be dynamically determined using digital wavelets or a wavelet transform (explained below) and the regions in the image may be dynamically blurred. The blurring causes an alteration and deliberate "smudging" of the halftone pattern/pixels in the image, so that the image no longer suffers from the same moiré pattern. For example, the blurring may remove detail from the halftone pattern/pixels, may smooth the pattern included in the halftone pattern/pixels and/or may reduce a frequency associated with the halftone pattern/pixels, which may reduce the perceived moiré pattern. Using the wavelet transforms, the regions may be determined based on an amount of high frequency components or a ratio of high frequency components to low frequency components including in portions of the an image. High frequency components may include frequent variations (e.g., variations exceeding a threshold) between pixels included in the image, which may be associated with a halftone pattern or other sharp transitions, while low frequency components may include infrequent variations (e.g., variations below the threshold) between pixels included in the image. The regions may be evenly blurred or may be dynamically blurred based on an amount of high frequency components or the ratio of high frequency components to low frequency components. That is, regions with higher frequency components, an increased amount of high frequency components, and/or a higher ratio of high frequency components to low frequency components may be blurred more than regions with lower frequency components, a reduced amount of high frequency components and/or a lower ratio of high frequency components to low frequency components. The regions may be blurred using a variety of known techniques, including mean filtering or using a convolution matrix, with weights of values in the convolution matrix determined based on the wavelet transform (as described below). In addition, a transition band may be determined around a perimeter of each of the regions that reduces an amount of blurring to provide a transition area between a blurred region in the center of the region and the unblurred region with no blur surrounding the region. The transition band smoothly transitions from the unblurred region to the blurred region, gradually blurring details so that an edge of the blurred region is not visible in the image and/or does not distract from the image.

FIG. 1 illustrates an overview of a system 100 for implementing embodiments of the disclosure. The system includes a device 102, such as an electronic reader, having a display 104. However, the present disclosure is not limited thereto and the device 102 may be any electronic device including a processor. As illustrated in FIG. 1, the device 102 may display an image 110 having a halftone pattern 112. The image 110 may be represented by image data, which may include pixel values and other information for each pixel included in the image. For ease of explanation, hereinafter "image" may be used to refer to both a visual representation of an image and corresponding image data associated with the visual representation of the image.

A halftone pattern, such as halftone pattern 212-1 illustrated in FIG. 2A, is a pattern of dots or lines that may vary in size or shape used to shade images, such as printed images included in newspapers, comics, manga or the like. For example, halftone pattern 212-1 illustrates individual dots in a halftone pattern, while halftone pattern 212-2 illustrates the halftone pattern from a distance, which appears to blend to create a smooth gradient from lighter at the top of the pattern to darker at the bottom of the pattern.

Figure 2B:
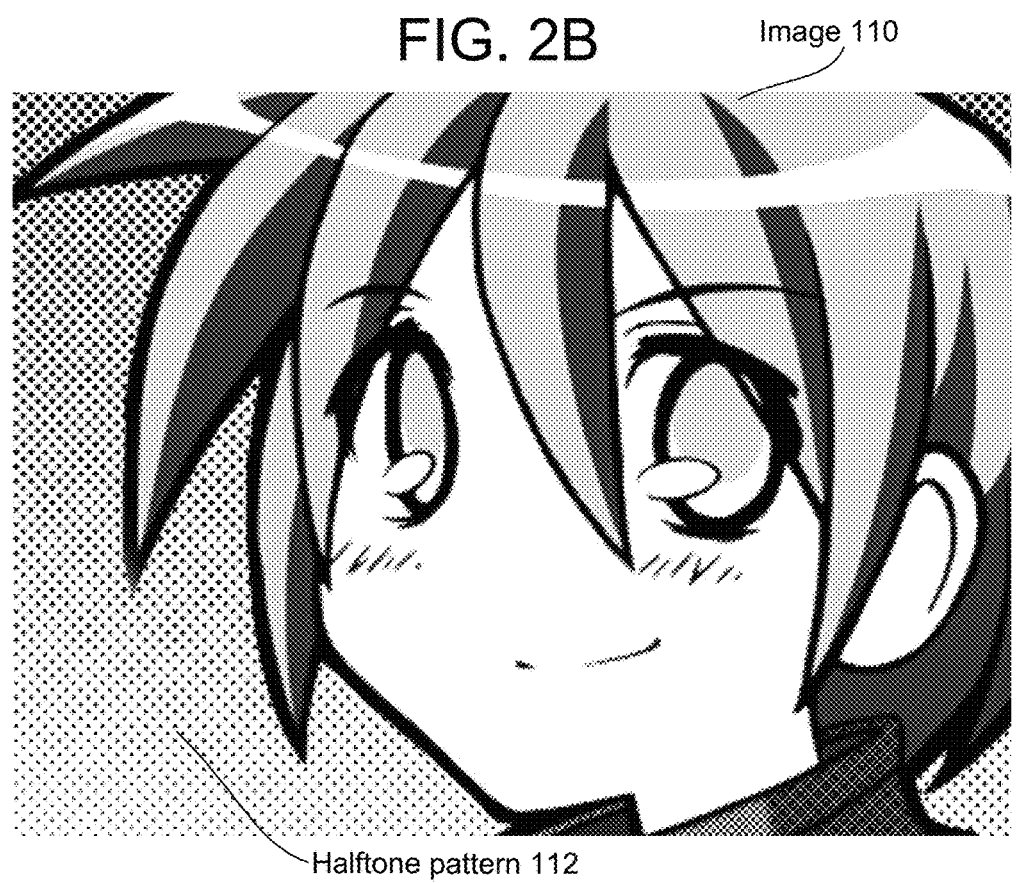
Figure 2C:
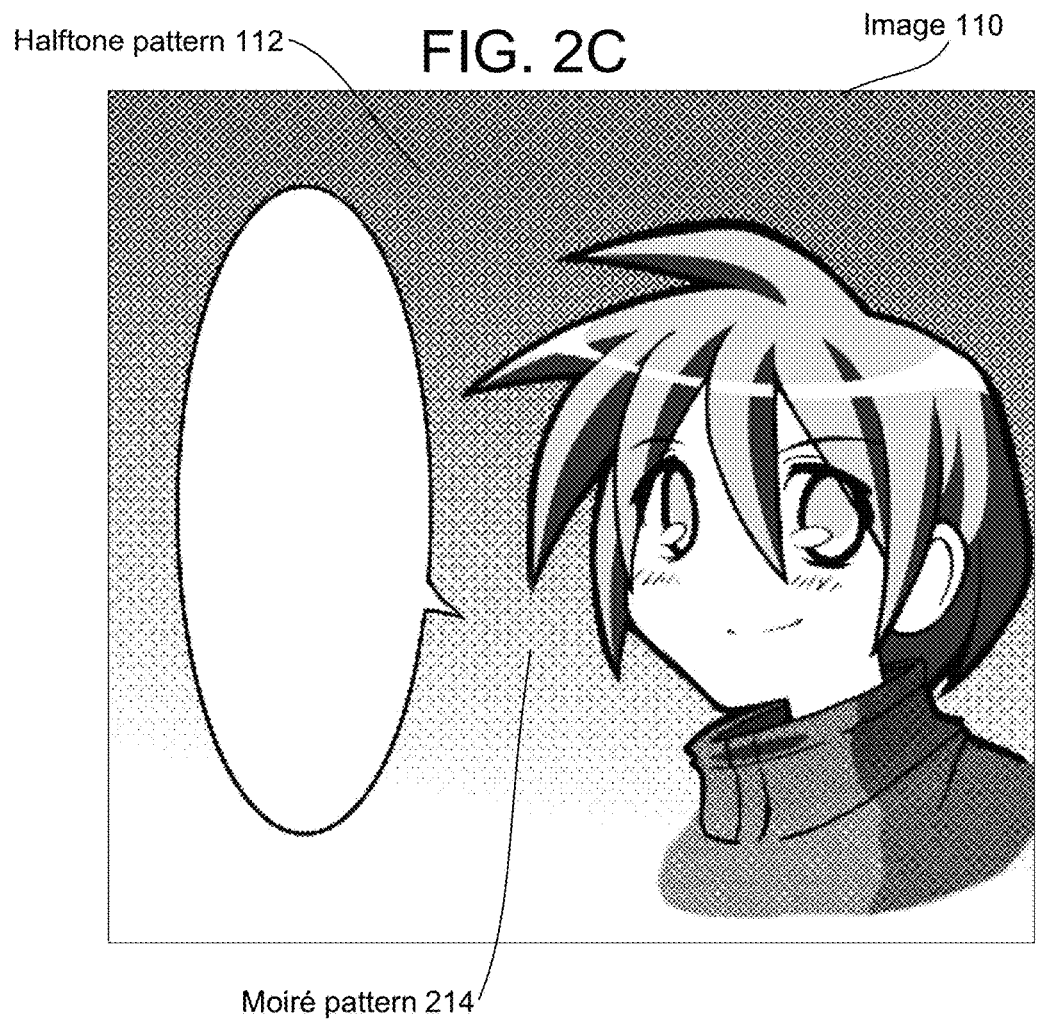
Figure 2D:
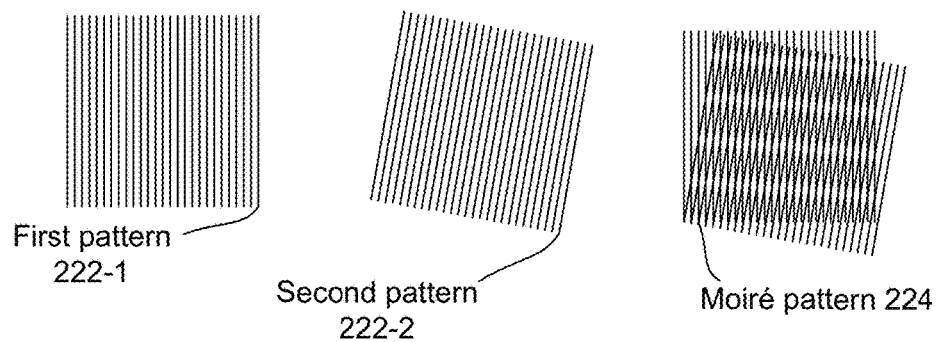
Figure 2E:

FIG. 2B illustrates a larger resolution version of the image 110 included in FIG. 1. As illustrated in FIG. 2B, the halftone pattern 112 is a series of dots used to provide texture to the background. However, while halftone patterns may blend to create smooth gradients or shades of color, at certain magnifications halftone patterns may also create a secondary pattern superimposed over the halftone pattern, called a moiré pattern. For example, the halftone pattern 112 illustrated in FIG. 2C includes a series of parallel dots that may create moiré pattern 214. Thus, when viewing the image 110 on the device 102 at various magnifications, the moiré pattern 214 may be visible at certain magnifications and not visible at other magnifications. While the moiré pattern 214 may be difficult to detect in FIG. 2C, FIG. 2D illustrates a simplified example of a moiré pattern 224 that is visible when overlaying a first pattern 222-1 and a second pattern 222-2. FIG. 2E illustrates an example of blurring an entirety of the image 110, which reduces the moiré pattern 214 in the halftone pattern 112 but also softens the image 110 and removes detail, resulting in an undesirable degradation of image quality.

To reduce a likelihood of the moiré pattern 214 being visible in the image 110, the device 102 may receive (120) the image 110 and may determine (122) regions including the halftone pattern 112 in the image 110. As will be discussed in greater detail below with regard to FIG. 3, the device 102 may determine regions including the halftone pattern 112 by identifying high frequency components in the image 110. For example, the device 102 may use digital wavelets, such as in a wavelet transform, to compare an amount of high frequency components to an amount of low frequency components. The device 102 may then identify regions having an amount of high frequency components above a threshold as including the halftone pattern 112. Alternatively, the device 102 may identify regions having a ratio of high frequency components to low frequency components above a threshold as including the halftone pattern 112. The present disclosure is not limited thereto, and may identify the halftone pattern 112 using any methods known to one of skill in the art.

The device 102 may selectively blur (124) regions of the image including the halftone pattern 112 determined in step 122. For example, the device 102 may use a convolution matrix to perform mean filtering of individual pixels within the image 110 to blur the pixels of the halftone pattern. Alternatively, the device 102 may blur the regions including the halftone pattern 112 using any methods known to one of skill in the art. In addition, the device 102 may include a transition band around the edge of the regions to be blurred, such that an intensity of the blur is reduced for the pixels in the transition band. Thus, the blurring may be reduced towards the edge of the regions including the halftone pattern 112 to more smoothly transition between the blurred portion of the halftone pattern 112 and the rest of the image 110.

The device 102 may then display/save (126) the blurred image 110. In some examples, the device 102 may display the image 110, while in other examples, the device 102 may display the image 110 and then save the image 110. Alternatively, the device 102 may save the image 110 without displaying the image 110. For example, if the device 102 is rendering content including the image 110, the device 102 may blur the regions including the halftone pattern 112 and display the image 110 including the blurred regions without modifying the underlying image 110 saved on the device 102. In this example, the device 102 would repeat steps 120-126 each time the device 102 renders the image 110 in order to blur the regions including the halftone pattern 112. As an alternative, the device 102 may save the image 110 after blurring the regions including the halftone pattern 112, allowing the device 102 to render the image 110 without repeating steps 120-126. In another example, the device 102 may perform steps 120-126 and save the image 110 after blurring the regions including the halftone pattern 112 without displaying the image 110. For example, the device 102 may acquire content including multiple images and may perform steps 120-126 on a first image and save the first image, then perform steps 120-126 on a second image, and so on. Thus, the device 102 may reduce a processing time required to render the multiple images in the future, but may reduce an amount of detail included in the multiple images as a result.

While the disclosure illustrates examples of selectively blurring a single image to reduce a likelihood of a moiré pattern being visible when displaying the image, the disclosure is not limited thereto. Indeed, the methods described with regard to FIGS. 1, 3 and 6A-6B may be applied to videos without departing from the disclosure. For example, each frame of a video is an image and may be selectively blurred using the methods described with regard to FIGS. 1, 3 and 6A-6B. Alternatively, the video may be selectively blurred continuously while displaying the video using an overlay layer or other methods known to one of skill in the art.

FIG. 3 illustrates a flowchart illustrating an example method for blurring an image according to embodiments of the present disclosure. The device 102 may receive (310) an image and may divide (312) the image into image blocks for further processing. For example, the device 102 may divide the image into 8 pixel by 8 pixel blocks (8×8 blocks), although the disclosure is not limited thereto and the size/arrangement of the blocks may vary. For example, the device 102 may divide the image into 16 pixel by 16 pixel blocks without departing from the disclosure. A size of the image blocks may be based on a total size of the image or based on a magnification of the displayed image. For example, a high resolution image displayed at a relatively low magnification may create a moiré pattern despite parallel lines in the high resolution image being separated by a number of pixels. Therefore, the device 102 may adaptively determine a size of the image blocks based on the magnification used to display the rendered image.

The device 102 may perform (314) a wavelet transform on each of the image blocks. For example, the device 102 may use digital wavelets to generate wavelet coefficients or a wavelet decomposition for each of the image blocks. The device 102 may use any wavelet transform known to one of skill in the art, such as discrete wavelet transforms or the like. The moiré pattern is typically created by image blocks having a high frequency pattern, such as a halftone pattern, which results in a number of high frequency components. Thus, the device 102 may use the wavelet transform to detect high frequency patterns in each image block by comparing the high frequency components of the image block to the low frequency components of the image block. The device 102 may use multiple wavelet transforms and/or may run a wavelet transform multiple times. For example, the device 102 may perform a first wavelet transform step and then perform a second wavelet transform step to acquire additional data. The wavelet transform may result in a series of raw numbers, such as a two-dimensional array of data. The two-dimensional array may correspond to grayscale and frequency associated with the image blocks. The raw numbers may be compared to a threshold to determine if corresponding image block(s) are candidate blocks in step 316. The data corresponding to an individual image block in the two-dimensional array may be summed to determine if the individual image block includes high frequency components. For example, a higher value for the sum corresponds to a higher frequency, which may correspond to a moiré pattern.

The device 102 may determine (316) image block(s) as candidate blocks that may include a halftone pattern. For example, the device 102 may determine if a ratio of the high frequency components to the low frequency components for each image block exceeds a threshold and associate image block(s) exceeding the threshold as candidate blocks. Alternatively, the device 102 may determine if a total number of high frequency components for each image block exceeds a threshold. High frequency components may include frequent variations (e.g., variations exceeding a threshold) between pixels included in the image, which may be associated with a halftone pattern or other sharp transitions, while low frequency components may include infrequent variations (e.g., variations below the threshold) between pixels included in the image. The device 102 may use multiple wavelet transforms, as discussed above, to assist in determining the image block(s) as candidate blocks. For example, the device 102 may perform a first wavelet transform step and identify a plurality of blocks that may include the halftone pattern, then perform a second wavelet transform step and either remove some of the plurality of blocks or add additional blocks to the plurality of blocks. Thus, the device 102 may perform steps 314 and 316 concurrently or may repeat step 314 for additional wavelet transforms.

The device 102 may merge (318) candidate blocks to form a selected pattern area(s). For example, the device 102 may remove candidate blocks that are not surrounded by other candidate blocks and may include image blocks that are surrounded by candidate blocks to form a contiguous selected pattern area(s). Thus, image blocks having high frequency components that do not correlate to a halftone pattern may be removed from the selected pattern area(s) and image blocks lacking high frequency components that correlate to a halftone pattern may be added to the selected pattern area(s) based on surrounding image blocks.

The device 102 may determine (320) transition band(s) for each of the selected area(s). For example, each selected area may have an 8 pixel wide transition band around a border of the pattern area, although the disclosure is not limited thereto. The transition band may act as a transition from a blurred region in the middle of the selected area to unblurred regions of the image surrounding the selected area. In addition, as a result of the transition band, smaller selected pattern areas (e.g., pattern areas having a radius less than 8 pixels wide when using an 8 pixel wide transition band) may not be blurred as the smaller pattern areas have a reduced likelihood of resulting in a moiré pattern.

Figure 4A:
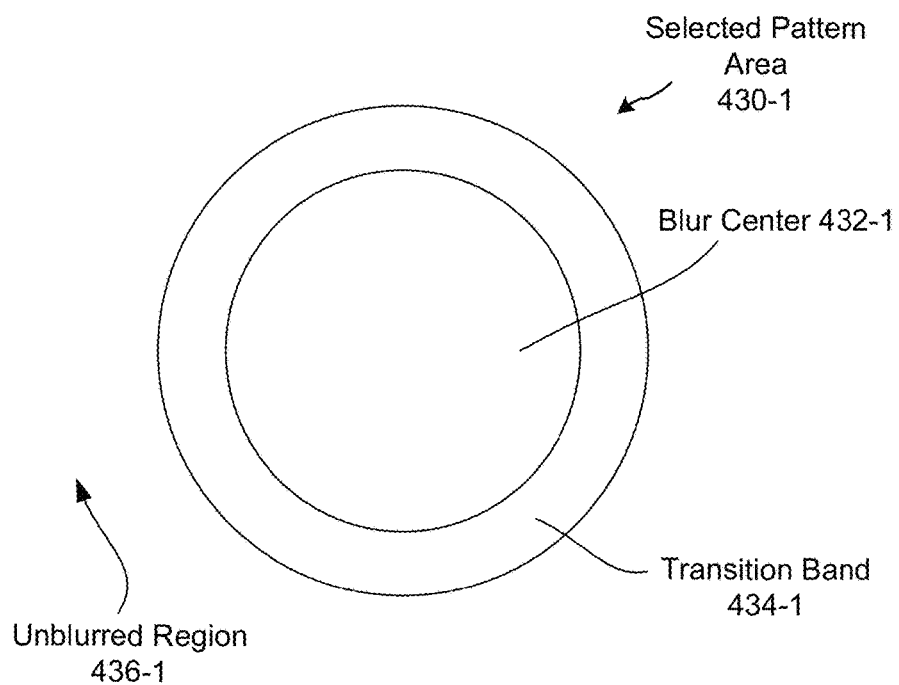
FIGS. 4A-4B illustrate examples of a transition region according to embodiments of the present disclosure.
Figure 4B:
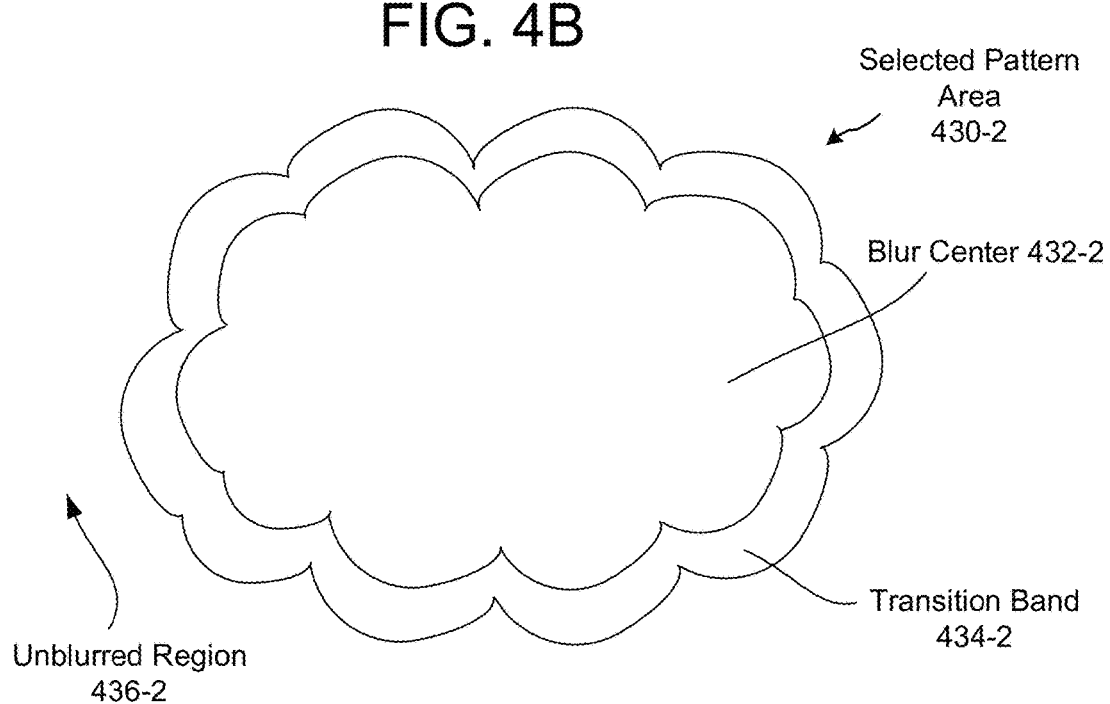

FIG. 4A illustrates an example of a first selected pattern area 430-1, which includes a first blur center 432-1 surrounded by a first transition band 434-1. The first transition band 434-1 extends to the edge of the first selected pattern area 430-1 and abuts first unblurred region 436-1, which includes portions of the image outside of the first pattern area 430-1. Similarly, FIG. 4B illustrates an example of a second selected pattern area 430-2, which includes a second blur center 432-2 surrounded by a second transition band 434-2. The second transition band 434-2 extends to the edge of the second selected pattern area 430-2 and abuts second unblurred region 436-2, which includes portions of the image outside of the second selected pattern area 430-2.

The device 102 may dynamically determine a width of the transition band for each pattern area based on a resolution of the image, a number of pixels used to display the image, a size of the pattern area, the wavelet transforms of image blocks surrounding the pattern area or the like. For example, a width of the transition band may be increased for a high resolution image, a larger number of pixels used to display the image or a larger pattern area, as the increased transition band may allow for a smoother rendering of the image with more details. In another example, a width of the transition band may vary based on the wavelet transforms of image blocks surrounding the pattern area, such that a width of the transition band may decrease near image blocks in the unblurred region having more high frequency components and may increase near image blocks in the unblurred region having fewer high frequency components.

The device 102 may apply (322) blur to the pattern area(s) excluding the transition band(s) and apply (324) blur to the transition band(s). In some embodiments, the device 102 may perform steps 322 and 324 substantially concurrently, using a reduced blurring effect for the transition band(s). For example, the device 102 may vary a weight of a center pixel in a convolution matrix based on a distance to an edge of the transition band, with a constant weight for distances exceeding a threshold. In other embodiments, the device 102 may perform step 322 to apply blur to the pattern area(s) excluding the transition band(s) and subsequently perform step 324 to apply blur to the transition band(s). To apply the blur to the pattern area(s), the device 102 may use a convolution matrix to perform mean filtering of individual pixels within the pattern area(s). Alternatively, the device 102 may blur the pattern area(s) using any methods known to one of skill in the art.

As an example of a convolution matrix, the device 102 may use first averaging kernel 520-1 illustrated in FIG. 5A to blur the selected pattern area(s). As illustrated in FIG. 5A, the first averaging kernel 520-1 is a 3 pixel by 3 pixel matrix, with each pixel having a weight of 1. To use the first averaging kernel 520-1, the device 102 may select an individual pixel from the pattern area(s) in a source image and may average values of adjacent pixels using the first averaging kernel 520-1. For example, as each pixel has a weight of 1, the device 102 may identify a 3×3 block of pixels surrounding the individual pixel and may determine an average of the 9 pixels included in the 3×3 block of pixels. The average is then used as a value of the individual pixel in a destination image. The device 102 continues through each pixel in the selected pattern area(s) using the first averaging kernel 520-1 to determine values for corresponding pixels in the destination image.

As illustrated in FIG. 5B, the device 102 may use second averaging kernel 520-2 to blur the selected pattern area(s). In contrast to the first averaging kernel 520-1, the second averaging kernel 520-2 uses a different weight for the individual pixel at a center of the 3×3 block of pixels. Therefore, the device 102 may identify a 3×3 block of pixels surrounding the individual pixel and may determine an average of the 9 pixels included in the 3×3 block of pixels, counting the individual pixel 8 times. An alternative way of illustrating the second averaging kernel 520-2 would be dividing a value of the individual pixel by 2 (e.g., using a weight of 8/16 or ½) and dividing values for each of the adjacent pixels in the 3×3 block by 16 (e.g., using a weight of 1/16) and summing the result. The sum is then used as a value of the individual pixel in a destination image, and the device 102 continues through each pixel in the selected pattern area(s) using the second averaging kernel 520-2 to determine values for corresponding pixels in the destination image.

As illustrated in FIG. 5C, the device 102 may instead use third averaging kernel 520-3 to blur the selected pattern area(s). Instead of a 3×3 block of pixels surrounding an individual pixel, the third averaging kernel 520-3 is a 5×5 block of pixels surrounding the individual pixel and each pixel is weighted equally except for the individual pixel, which has a weight of N. The weight of the individual pixel may vary based on if the individual pixel is outside of the transition band, a distance from the individual pixel to an edge of the transition band and/or the like. Increasing the weight of the individual pixel decreases an amount of blur, as the individual pixel is included multiple times relative to the surrounding pixels. Similarly, decreasing the weight of the individual pixel increases an amount of blur, as the individual pixel is included fewer times relative to the surrounding pixels. If N=1, the 5×5 block of the third averaging kernel 520-3 results in an increased amount of blur relative to the first averaging kernel 520-1, as the individual pixel is compared to additional surrounding pixels. The disclosure is not limited thereto, however, and a size of the convolution matrix and weights for pixels included in the convolution matrix may vary without departing from the present disclosure.

In some embodiments, the device 102 may use a different convolution matrix for the transition band(s) in step 324 than for the pattern area(s) excluding the transition band(s) in step 322. For example, the device 102 may use a higher weight for the individual pixel in a center of the convolution matrix (e.g., lower weights for the adjacent pixels) in the transition band(s) to reduce an amount of blur. Alternatively, the device 102 may dynamically blur the transition band(s), using different weights in the convolution matrix based on a proximity between the individual pixel and an edge of the selected pattern area(s) (e.g., proximity to the unblurred region). Thus, the device 102 may use a 3×3 block of pixels with a weight of 1 for an individual pixel in step 322, while using a weight of 8 for an individual pixel a first distance from the unblurred region, a weight of 16 for an individual pixel a second distance from the unblurred region and so on.

In addition, the device 102 may determine weights for the adjacent pixels based on a proximity of the unblurred region to the individual pixel. For example, for an individual pixel located along a vertical edge between the unblurred region and the selected pattern area, the unblurred region is in a horizontal direction relative to the individual pixel. Therefore, pixels in a first column of the convolution matrix may have a first weight, pixels in a second column of the convolution matrix may have a second weight, and pixels in a third column of the convolution matric may have a third weight. Similarly, for an individual pixel located along a horizontal edge between the unblurred region and the selected pattern area, the unblurred region is in a vertical direction relative to the individual pixel. Therefore, pixels in a first row, a second row and a third row may have a first weight, a second weight and a third weight, respectively. In some examples, the weighting for a column near a vertical edge and/or the weighting for a row near a horizontal edge may be equal to 0, so that the pixels in the column and/or row are not calculated into the average for the individual pixel.

In steps 322 and 324, the device 102 may dynamically blur image blocks within the selected pattern area(s) based on the wavelet transform for each image block. For example, the device 102 may increase an amount of blur for image blocks having a larger number of high frequency components relative to image blocks having a smaller number of high frequency components. Thus, image blocks in the selected pattern area(s) more likely to result in moiré pattern (e.g., image blocks having more high frequency components or a higher ratio of high frequency components to low frequency components) may be more heavily blurred than image blocks in the selected pattern area(s) less likely to result in the moiré pattern.

After blurring the selected pattern area(s) and the transition band(s), the device 102 may display/save (326) the image with the blurred regions. In some examples, the device 102 may display the image, while in other examples, the device 102 may display the image and then save the image. Alternatively, the device 102 may save the image without displaying the image. For example, if the device 102 is rendering content including a first image, the device 102 may blur regions including a halftone pattern in the first image and overwrite the existing first image with the blurred version of the first image. Thus, the device 102 may reduce a processing time required to render the first image in the future, but may permanently reduce an amount of detail included in the first image as a result. Alternatively, if the device 102 is rendering content including a first image, the device 102 may blur regions including a halftone pattern in the first image to generate a second image and display the second image without modifying the first image or saving the second image. In this example, the device 102 may repeat steps 310-326 each time the device 102 opens the first image in order to display the second image. As another example, the device 102 may save the second image, allowing the device 102 to display the second image without repeating steps 310-326. In some examples, the device 102 may perform steps 310-326 and save the second image without displaying the second image. For example, the device 102 may acquire content including multiple images and may perform steps 310-326 on a first image to generate a second image and save the second image, then perform steps 310-326 on a third image to generate a fourth image and save the fourth image, and so on.

Some devices 102 may perform steps 310-326 to display and render content, such as for a user or a reader to view. These devices may perform these steps while displaying and rendering the content or may perform these steps upon acquiring the content. Other devices 102 may perform steps 310-326 to prepare a series of images, such as a published document, for other devices to display and render.

In some examples, a user of the device 102 may input values for thresholds or other settings to identify the halftone pattern based on user preference. For example, the device 102 may display an interface for the user to interact with an application running on the device 102 to choose thresholds and view the resulting pattern area. The device 102 may receive the inputs from the user, modify the thresholds or other settings, determine the pattern area(s) and display the pattern area(s) to the user before performing steps 322 and 324 to blur the pattern area(s).

Figure 6A:
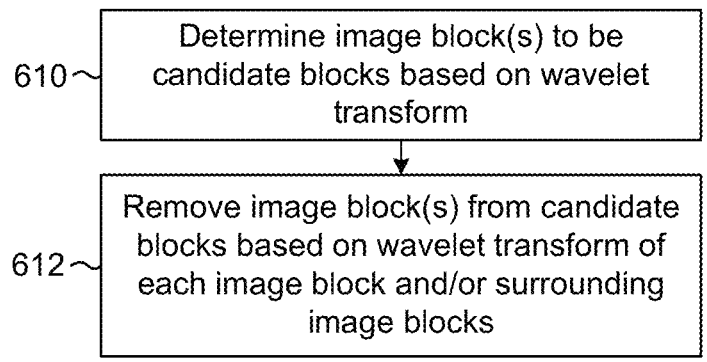
FIGS. 6A-6B illustrate flowcharts illustrating example methods for removing and merging image blocks according to embodiments of the present disclosure.

FIG. 6A illustrates a flowchart illustrating an example method for determining image blocks in step 316, according to embodiments of the present disclosure. As illustrated in FIG. 6A, the device 102 may determine (610) image block(s) to be candidate blocks based on the wavelet transform for each of the image blocks. As discussed above, the device 102 may determine if a ratio of the high frequency components to the low frequency components for each image block exceeds a threshold and associate image block(s) exceeding the threshold as candidate blocks. Alternatively, the device 102 may determine if a total number of high frequency components for each image block exceeds a threshold. The device 102 may use a lower threshold in step 610 relative to the threshold of step 316, thus increasing a number of candidate blocks to include a larger percentage of potential candidate blocks.

The device 102 may then remove (612) image block(s) from the candidate blocks based on the wavelet transform of each image block and/or surrounding image blocks. For example, the device 102 may analyze the wavelet transform of each image block and determine that the image block is not a candidate. Alternatively, the device 102 may compare the wavelet transform for each image block to wavelet transforms of surrounding image blocks and selectively remove image block(s).

As part of steps 610-612, the device 102 may perform multiple wavelet transforms and/or multiple thresholds. For example, the device 102 may perform a first wavelet transform and/or use a first threshold to include a large number of image blocks as candidate blocks in step 610, then perform a second wavelet transform and/or use a second threshold on the candidate blocks in step 612. Thus, while step 610 included a larger percentage of potential candidate blocks to remove false negative error (e.g., image blocks including a halftone pattern that are not determined to be candidate blocks), step 612 removes potential candidate blocks to remove false positive error (e.g., image blocks not including a halftone pattern that are determined to be candidate blocks). Steps 610-612 may be performed using raw numbers, such as a two-dimensional array of data, that were generated by a wavelet transform.

Figure 6B:
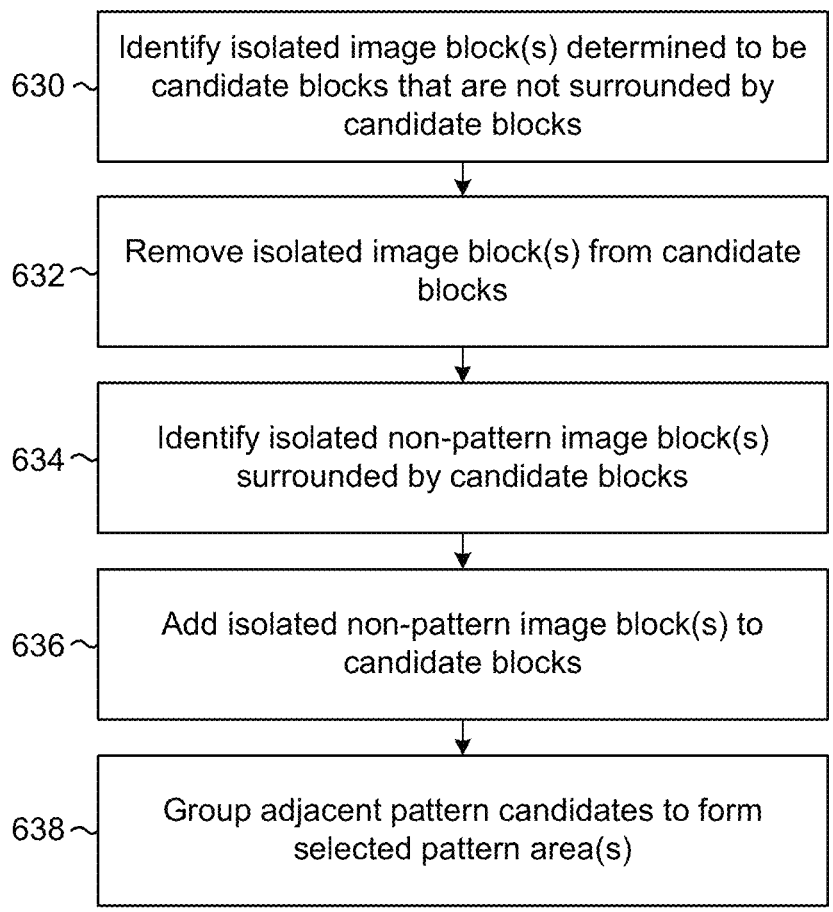

FIG. 6B illustrates a flowchart illustrating an example method for merging image blocks in step 318, according to embodiments of the present disclosure. Using steps 630-638, the device 102 may reduce a number of selected pattern areas and remove smaller pattern areas that are unlikely to result in a moiré pattern being visible. By reducing the number of selected pattern areas, the device 102 may simplify the blur process, while removing smaller pattern areas may decrease unnecessary blurring, increasing an amount of detail in a resulting image.

As illustrated in FIG. 6B, the device 102 may identify (630) isolated image block(s) determined to be candidate blocks that are not surrounded by candidate blocks and may remove (632) the isolated image block(s) from the candidate blocks. For example, image blocks with high frequency components that are not surrounded by other image blocks with high frequency components are removed from the candidate blocks. While some of the image blocks may include a halftone pattern, the small size of the halftone pattern reduces a likelihood of a moiré pattern being visible.

The device 102 may identify (634) isolated non-pattern image block(s) surrounded by candidate blocks, add (636) the isolated non-pattern image block(s) to the candidate blocks and group (638) adjacent candidate blocks to form pattern area(s). For example, image blocks without high frequency components that are surrounded by image blocks with high frequency components may be added to the candidate blocks. While some of the isolated non-pattern image block(s) may not include a halftone pattern, including the isolated non-pattern image block(s) in the pattern area(s) reduces a complexity involved in blurring the pattern area(s) and increases a smoothness of the resulting blur.

Figure 7A:
Figure 7C:

FIGS. 7A-7C illustrate an image being blurred according to embodiments of the present disclosure. FIG. 7A illustrates a first image 710-1, which includes halftone patterns used to shade the first image 710-1. The halftone patterns may cause an increased likelihood of a visible moiré pattern being superimposed on the first image 710-1 when the first image 710-1 is displayed. To reduce the likelihood of the moiré pattern being visible, the halftone patterns may be blurred. However, the first image 710-1 includes details, such as details in the face, hair and text bubble, and blurring these details may degrade an image quality for the first image 710-1. Therefore, the device 102 may selectively blur the first image 710-1 to target the halftone patterns that are more likely to result in moiré effects.

To selectively blur the halftone patterns, the device 102 may perform the methods discussed above with regard to FIGS. 3 and 6. For example, FIG. 7B illustrates the device 102 determining a pattern area 730 in second image 710-2. The pattern area 730 includes a blur center 732 indicated by dark gray portions of the second image 710-2 and a transition band 734 around the blur center 732 indicated by light gray portions of the second image 710-2, while the unblurred region 736 is indicated by white portions of the second image 710-2. The unblurred region 736 includes the details in the face, hair and text bubble. While not illustrated in FIG. 7B, variations in the pattern area 730 may correlate to an amount of high frequency components and the pattern area 730 may therefore be dynamically blurred based on the amount of high frequency components in different image blocks in the pattern area 730.

After determining the pattern area 730, the device 102 may blur the pattern area 730 as discussed in greater detail above with regard to FIG. 3. FIG. 7C illustrates third image 710-3, which includes blurred pattern area 740 after the blurring process is performed. While the blurred pattern area 740 in the third image 710-3 may include a halftone pattern, the blurring process may reduce a likelihood of a moiré pattern being visible while displaying the third image 710-3 at various magnifications as the halftone pattern is spread amongst several pixels by the blurring process. As illustrated by FIG. 7C, the third image 710-3 displays full details in the face, hair and text bubble, while blurring the halftone pattern in the background and in the shirt. Thus, the third image 710-3 reduces a likelihood of a visible moiré pattern without degrading image quality, in contrast to the blurred image 210 illustrated in FIG. 2E.

FIG. 8 illustrates a block diagram conceptually illustrating example components of a device 102 according to embodiments of the present disclosure. In operation, the device 102 may include computer-readable and computer-executable instructions that reside in storage 808 on the device 102. The device 102 may be an electronic device capable of displaying images. Examples of electronic devices may include computers (e.g., a desktop, a laptop, a server or the like), portable devices (e.g., an electronic reader, smart phone, tablet, smart watch or the like) or the like. The device 102 may also be a component of any of the abovementioned devices or systems.

The device 102 may include one or more controllers/processors 804 comprising one-or-more central processing units (CPUs) for processing data and computer-readable instructions and a memory 806 for storing data and instructions. The memory 806 may include volatile random access memory (RAM), non-volatile read only memory (ROM), non-volatile magnetoresistive (MRAM) and/or other types of memory. The device 102 may also include a data storage component 808 for storing data and processor-executable instructions. The data storage component 808 may include one or more non-volatile storage types such as magnetic storage, optical storage, solid-state storage, etc. The device 102 may also be connected to a removable or external non-volatile memory and/or storage (such as a removable memory card, memory key drive, networked storage, etc.) through the input/output device interfaces 802. The input/output device interfaces 802 may be configured to operate with a network 801, for example a wireless local area network (WLAN) (such as WiFi), Bluetooth, zigbee and/or wireless networks, such as a Long Term Evolution (LTE) network, WiMAX network, 3G network, etc. The network 801 may include a local or private network or may include a wide network such as the internet. Devices may be connected to the network 801 through either wired or wireless connections.

Depending upon a complexity of the device 102, the device 102 may omit components illustrated in FIG. 8 or may include other components not illustrated. For example, devices may include multiple components not illustrated in FIG. 8 without departing from the present disclosure.

As discussed above, the device 102 includes input/output device interfaces 802, controller(s)/processors 804, memory 806 and storage 808, which may be coupled by a bus 824. In addition, the device 102 may include a blur module 840, which may comprise processor-executable instructions stored in storage 808 to be executed by controller(s)/processor(s) 804 (e.g., software, firmware), hardware, or some combination thereof. For example, components of the blur module 840 may be part of a software application running in the foreground and/or background on the device 102. The blur module 840 may control the device 102 as discussed above, for example with regard to FIGS. 1, 3 and/or 6.

Executable instructions for operating the device 102 and its various components may be executed by the controller(s)/processor(s) 804, using the memory 806 as temporary "working" storage at runtime. The executable instructions may be stored in a non-transitory manner in non-volatile memory 806, storage 808, or an external device. Alternatively, some or all of the executable instructions may be embedded in hardware or firmware in addition to or instead of software.

The concepts disclosed herein may be applied within a number of different devices and computer systems, including, for example, general-purpose computing systems, televisions, stereos, radios, server-client computing systems, mainframe computing systems, telephone computing systems, laptop computers, cellular phones, personal digital assistants (PDAs), tablet computers, wearable computing devices (watches, glasses, etc.), other mobile devices, etc.

Embodiments of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media.

Embodiments of the present disclosure may be performed in different forms of software, firmware and/or hardware. Further, the teachings of the disclosure may be performed by an application specific integrated circuit (ASIC), field programmable gate array (FPGA), or other component, for example.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method of selectively blurring an image, the method comprising:
receiving image data representing a halftone pattern image including a halftone pattern, the halftone pattern including dots used to simulate shades of color;
dividing the image data into a plurality of image blocks;
determining variations in color between adjacent pixels within a first image block, the first image block including the halftone pattern;
determining a first amount of high frequency components associated with the first image block, each of the high frequency components corresponding to a portion of the first image block having a first number of variations exceeding a first threshold;
determining a second amount of low frequency components associated with the first image block, each of the low frequency components corresponding to a portion of the first image block having a second number of variations below a second threshold;
determining that a first ratio of the high frequency components to the low frequency components associated with the first image block exceeds a third threshold;
selecting an area of the image data, the selected area comprising the first image block;
identifying a transition band, the transition band located within the selected area and along an edge of the selected area bordering a remainder of the image data outside the selected area;
identifying first pixels included in the transition band, the first pixels being within a first distance from the edge of the selected area;
identifying second pixels included in the selected area and excluded from the transition band;
blurring the first pixels a third amount to reduce a frequency of variation between the first pixels, wherein the blurring modifies a first pixel value of a first pixel of the first pixels using pixel values of adjacent pixels; and
blurring the second pixels a fourth amount to reduce a frequency of variation between the second pixels, wherein the blurring modifies a second pixel value of a second pixel of the second pixels using pixel values of adjacent pixels and wherein the third amount weights the first pixel value relative to the adjacent pixel values higher than the fourth amount weights the second pixel value relative to the adjacent pixel values.

2. The computer-implemented method of claim 1, further comprising:

determining that an edge of the selected area is within a second distance from one of the first pixels;
determining that the edge of the selected area extends in a first direction;
determining a first column of a first convolution matrix, the first column comprising third pixels and being parallel to the first direction;
assigning a first weight to each of the third pixels;
determining a second column of the first convolution matrix, the second column comprising fourth pixels and being further from the edge of the selected area than the first column; and
assigning a second weight to each of the fourth pixels, the second weight being less than the first weight,
wherein the blurring the first pixels further comprises:
blurring the one of the first pixels using the first convolution matrix.

3. The computer-implemented method of claim 1, wherein the selecting further comprises:
determining that a second ratio of high frequency components to low frequency components associated with a second image block is below the third threshold;
determining that the second image block is surrounded by the selected area; and
including the second image block in the selected area.

4. The computer-implemented method of claim 1, wherein the selecting further comprises:
determining that a second ratio of high frequency components to low frequency components associated with a second image block exceeds the third threshold;
determining that a third ratio of high frequency components to low frequency components associated with image blocks adjacent to the second image block is below the third threshold; and
removing the second image block from the selected area.

5. A computer-implemented method, the method comprising:
receiving image data representing a halftone pattern, the halftone pattern including dots used to simulate shades of color;
determining a first image block from the image data, the first image block including the halftone pattern;
identifying a high frequency component associated with the first image block, wherein the high frequency component comprises a number of color changes of pixels associated with the halftone pattern within a certain region of the first image block, where the number exceeds a first threshold;
determining that a first amount of high frequency components associated with the first image block exceeds a second threshold;
selecting an area of the image data comprising the first image block;
identifying first pixels included in a transition band for the selected area, the first pixels being in the selected area within a first distance from an edge of the selected area;
identifying second pixels included in the selected area but excluded from the transition band;
determining a first new pixel value for a first pixel of the first pixels using a first weight; and
determining a second new pixel value for a second pixel of the second pixels using a second weight, wherein the first weight is greater than the second weight.

6. The computer-implemented method of claim 5, wherein the identifying further comprises:
performing a wavelet transformation on the first image block to generate a first wavelet transform,
wherein the determining that a first amount exceeds a second threshold comprises determining that the first amount of high frequency components exceeds the second threshold using the first wavelet transform.

7. The computer-implemented method of claim 5, wherein the determining a new pixel value further comprises:
determining the new pixel value for the at least one pixel using a convolution matrix.

8. The computer-implemented method of claim 7, wherein the determining a new pixel value further comprises:
determining a weight of a center pixel relative to adjacent pixels in the convolution matrix using the first amount of high frequency components within the first image block.

9. The computer-implemented method of claim 5, further comprising:
determining that an edge of the selected area is within a second distance from one of the first pixels;
determining that the edge of the selected area extends in a first direction;
determining a third weight for third pixels of a first convolution matrix extending in the first direction; and
determining a fourth weight for fourth pixels of the first convolution matrix extending in the first direction, the third weight being larger than the fourth weight, the fourth pixels being further from the edge of the selected area than the third pixels,
wherein the determining a first new pixel value further comprises:
determining the first new pixel value using the first convolution matrix.

10. The computer-implemented method of claim 5, wherein the selecting further comprises:
determining that a second amount of high frequency components associated with a second image block is below the second threshold;
determining that the second image block is surrounded by the selected area; and
including the second image block in the selected area.

11. The computer-implemented method of claim 5, further comprising:
determining that a second amount of high frequency components associated with a second image block exceeds the second threshold;
determining that a third amount of high frequency components associated with image blocks adjacent to the second image block is below the second threshold; and
removing the second image block from the selected area.

12. A device, comprising:
at least one processor;
a memory device including instructions operable to be executed by the at least one processor to cause the device to:
receive image data representing a halftone pattern, the halftone pattern including dots used to simulate shades of color;
determine a first image block from the image data, the first image block including the halftone pattern;
identify a high frequency component associated with the first image block, wherein the high frequency component comprises a number of color changes of pixels associated with the halftone pattern within a certain region of the first image block where the number exceeds a first threshold;

determine that a first amount of high frequency components associated with first image blocks exceeds a second threshold;
select an area of the image data comprising the first image block;
identify first pixels included in a transition band for the selected area, the first pixels being in the selected area within a first distance from an edge of the selected area;
identify second pixels included in the selected area and excluded from the transition band; and
determine a first new pixel value for a first pixel of the first pixels using a first weight; and
determine a second new pixel value for a second pixel of the second pixels using a second weight, wherein the first weight is greater than the second weight.

13. The device of claim 12, wherein the instructions further configure the device to:
perform a wavelet transformation on the first image block to generate a first wavelet transform,
wherein the device determines that the first amount of high frequency components exceeds the second threshold using the first wavelet transform.

14. The device of claim 12, wherein the instructions further configure the device to:
determine the new pixel value for the at least one pixel using a convolution matrix.

15. The device of claim 14, wherein the instructions further configure the device to:
determine a weight of a center pixel relative to adjacent pixels in the convolution matrix using the first amount of high frequency components within the first image block.

16. The device of claim 12, wherein the instructions further configure the device to:
determine that an edge of the selected area is within a second distance from one of the first pixels;
determining that the edge of the selected area extends in a first direction;
determine a third weight for third pixels of a first convolution matrix extending in the first direction; and
determine a fourth weight for fourth pixels of the first convolution matrix extending in the first direction, the third weight being larger than the fourth weight, the fourth pixels being further from the edge of the selected area than the third pixels; and
determine the first new pixel value using the first convolution matrix.

17. The device of claim 12, wherein the instructions further configure the device to:
determine that a second amount of high frequency components associated with a second image block is below the second threshold;
determine that the second image block is surrounded by the selected area; and
include the second image block in the selected area.

18. The device of claim 12, wherein the instructions further configure the device to:
determine that a second amount of high frequency components associated with a second image block exceeds the second threshold;
determine that a third amount of high frequency components associated with image blocks adjacent to the second image block is below the second threshold; and
remove the second image block from the selected area.

* * * * *